United States Patent
Bloomberg et al.

(10) Patent No.: US 10,313,501 B2
(45) Date of Patent: *Jun. 4, 2019

(54) COMPUTER TERMINALS BIOMETRICALLY ENABLED FOR NETWORK FUNCTIONS AND VOICE COMMUNICATION

(71) Applicant: Bloomberg Finance L.P., New York, NY (US)

(72) Inventors: Michael R. Bloomberg, New York, NY (US); John D. Waanders, Pelham, NY (US); Helmars Ericks Ozolins, Orient, NY (US)

(73) Assignee: BLOOMBERG FINANCE L.P., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/876,735

(22) Filed: Jan. 22, 2018

(65) Prior Publication Data

US 2018/0146079 A1    May 24, 2018

Related U.S. Application Data

(63) Continuation of application No. 15/164,322, filed on May 25, 2016, now Pat. No. 9,912,793, which is a
(Continued)

(51) Int. Cl.
*H04M 1/247* (2006.01)
*H04M 3/533* (2006.01)
(Continued)

(52) U.S. Cl.
CPC .......... *H04M 1/2473* (2013.01); *G06F 21/32* (2013.01); *H04M 1/06* (2013.01); *H04M 1/67* (2013.01);
(Continued)

(58) Field of Classification Search
CPC ... H04W 12/06; H04W 12/08; H04W 76/023; H04W 4/02; H04W 84/12; H04W 48/18;
(Continued)

(56) References Cited

U.S. PATENT DOCUMENTS 3,804,524 A    4/1974  Jocoy et al.
4,394,773 A    7/1983  Ruell
(Continued)

FOREIGN PATENT DOCUMENTS

DE    19541672 A1    5/1997
DE    29722222 U1    6/1998
(Continued)

OTHER PUBLICATIONS

Dr. Manfred Bomba, "Fingerprint-Handy," Innovations: Fingerprint, CeBIT 99 Flyer; retrieved online from http://w4seimens.de/newsline.d/pressfor/end99101.htm; (visited Jan. 24, 2002), 5 pp.
(Continued)

*Primary Examiner* — Yong Hang Jiang
(74) *Attorney, Agent, or Firm* — Chiesa Shahinian & Giantomasi PC

(57) ABSTRACT

The invention provides a handset that includes a finger-image sensor that provides finger-image-related signals or data for authentication purposes and functions as a telephone handset for use with a computer terminal. A system, including handsets and computer terminals, enables the terminal and/or the handset to access or otherwise participate in at least one network-related function and voice communication in response to authentication of finger-image data provided by the handset.

20 Claims, 5 Drawing Sheets

Related U.S. Application Data continuation of application No. 12/044,616, filed on Mar. 7, 2008, now Pat. No. 9,378,347, which is a continuation of application No. 10/081,132, filed on Feb. 21, 2002, now Pat. No. 7,418,255.

(51) Int. Cl.
| | | |
|---|---|---|
| *G06F 21/32* | (2013.01) | |
| *H04M 1/67* | (2006.01) | |
| *H04M 1/06* | (2006.01) | |
| *H04M 1/725* | (2006.01) | |

(52) U.S. Cl.
CPC .... *H04M 3/53308* (2013.01); *H04M 1/72519* (2013.01); *H04M 2203/6054* (2013.01); *H04M 2250/12* (2013.01)

(58) Field of Classification Search
CPC ....... H04W 4/008; H04W 4/14; H04W 76/02; H04W 88/06; H04W 4/12; H04W 4/206; H04W 88/02
USPC .......... 340/5.51, 5.52, 5.53, 5.8, 5.81, 5.82, 340/5.83, 5.84, 5.85
See application file for complete search history.

(56) References Cited

U.S. PATENT DOCUMENTS

| | | | |
|---|---|---|---|
| 4,408,323 A | 10/1983 | Montgomery | |
| 4,453,247 A | 6/1984 | Suzuki et al. | |
| 4,581,735 A | 4/1986 | Flamm et al. | |
| 4,782,485 A | 11/1988 | Gollub | |
| 4,857,916 A | 8/1989 | Bellin | |
| 4,905,293 A | 2/1990 | Asai et al. | |
| 4,914,650 A | 4/1990 | Sriram | |
| 5,144,680 A | 9/1992 | Kobayashi et al. | |
| 5,337,043 A | 8/1994 | Gokcebay | |
| 5,412,463 A | 5/1995 | Sibbald et al. | |
| 5,420,936 A | 5/1995 | Fitzpatrick et al. | |
| 5,467,403 A | 11/1995 | Fishbine et al. | |
| 5,546,471 A | 8/1996 | Merjanian | |
| 5,603,179 A | 2/1997 | Adams | |
| 5,617,423 A | 4/1997 | Li et al. | |
| 5,715,518 A | 2/1998 | Barrere et al. | |
| 5,732,133 A | 3/1998 | Mark | |
| 5,796,858 A | 8/1998 | Zhou et al. | |
| 5,828,773 A | 10/1998 | Setlak et al. | |
| 5,838,306 A | 11/1998 | O'Connor et al. | |
| 5,852,670 A | 12/1998 | Setlak et al. | |
| 5,872,834 A | 2/1999 | Teitelbaum | |
| 5,881,226 A | 3/1999 | Veneklase | |
| 5,910,946 A | 6/1999 | Csapo | |
| 5,920,642 A | 7/1999 | Merjanian | |
| 5,926,261 A | 7/1999 | Hoshino | |
| 5,953,322 A | 9/1999 | Kimball | |
| 5,970,458 A | 10/1999 | Petkovsek | |
| 5,991,408 A | 11/1999 | Pearson et al. | |
| 6,011,806 A | 1/2000 | Fujieda et al. | |
| 6,014,687 A | 1/2000 | Watanabe et al. | |
| 6,016,476 A | 1/2000 | Maes et al. | |
| 6,028,950 A | 2/2000 | Merjanian | |
| 6,035,188 A | 3/2000 | Hoogerwerf et al. | |
| 6,058,304 A | 5/2000 | Callaghan et al. | |
| 6,061,790 A | 5/2000 | Bodnar | |
| 6,064,737 A | 5/2000 | Rhoads | |
| 6,078,848 A | 6/2000 | Bernstein et al. | |
| 6,078,908 A | 6/2000 | Schmitz | |
| 6,088,585 A | 7/2000 | Schmitt et al. | |
| 6,111,977 A | 8/2000 | Scott et al. | |
| 6,141,436 A | 10/2000 | Srey et al. | |
| 6,154,727 A | 11/2000 | Karp et al. | |
| 6,160,903 A | 12/2000 | Hamid et al. | |
| 6,175,922 B1 | 1/2001 | Wang | |
| 6,177,950 B1 | 1/2001 | Robb | |
| 6,191,410 B1 | 2/2001 | Johnson | |
| 6,219,793 B1 | 4/2001 | Li et al. | |
| 6,222,859 B1 | 4/2001 | Yoshikawa | |
| 6,249,672 B1 | 6/2001 | Castiel | |
| 6,256,737 B1 | 7/2001 | Bianco et al. | |
| 6,282,304 B1 | 8/2001 | Novikov et al. | |
| 6,330,457 B1 | 12/2001 | Yoon | |
| 6,337,918 B1 | 1/2002 | Holehan | |
| 6,337,919 B1 | 1/2002 | Dunton | |
| 6,404,862 B1 | 6/2002 | Holt | |
| 6,493,437 B1 | 12/2002 | Olshansky | |
| 6,636,620 B1 | 10/2003 | Hoshino | |
| 7,418,255 B2 | 8/2008 | Bloomberg et al. | |
| 2001/0012201 A1 | 8/2001 | Fries et al. | |
| 2001/0016819 A1 | 8/2001 | Kolls | |
| 2001/0017584 A1 | 8/2001 | Shinzaki | |
| 2001/0034717 A1 | 10/2001 | Whitworth | |
| 2001/0048025 A1 | 12/2001 | Shinn | |
| 2001/0048359 A1 | 12/2001 | Yamane et al. | |
| 2001/0049785 A1 | 12/2001 | Kawan et al. | |
| 2001/0051924 A1 | 12/2001 | Uberti | |
| 2002/0003892 A1 | 1/2002 | Iwanaga | |
| 2002/0007459 A1 | 1/2002 | Cassista et al. | |
| 2002/0010857 A1 | 1/2002 | Karthik | |
| 2002/0010864 A1 | 1/2002 | Safa | |
| 2002/0034939 A1 | 3/2002 | Wenzel | |
| 2002/0095516 A1 | 7/2002 | Nada | |
| 2002/0106077 A1 | 8/2002 | Moquin et al. | |
| 2002/0122415 A1 | 9/2002 | Chang et al. | |
| 2002/0152391 A1 | 10/2002 | Willins et al. | |
| 2002/0174345 A1 | 11/2002 | Patel | |
| 2003/0046557 A1 | 3/2003 | Miller et al. | |
| 2003/0081752 A1 | 5/2003 | Trandal et al. | |
| 2005/0050090 A1 | 3/2005 | Kawahata et al. | |
| 2007/0155366 A1* | 7/2007 | Manohar ............ H04M 1/2535 455/411 |
| 2010/0075631 A1* | 3/2010 | Black ................... H04M 1/05 455/410 |

FOREIGN PATENT DOCUMENTS

| | | |
|---|---|---|
| DE | 19832638 A1 | 1/2000 |
| DE | 20008345 U1 | 8/2000 |
| DE | 19920933 A1 | 11/2000 |
| EP | 0593386 A2 | 4/1994 |
| EP | 3817515 A1 | 1/1998 |
| EP | 0969644 A1 | 1/2000 |
| EP | 1011285 A1 | 6/2000 |
| EP | 1154383 A2 | 11/2001 |
| FR | 2792438 A1 | 10/2000 |
| GB | 2312040 A | 10/1997 |
| JP | 61175866 A | 7/1986 |
| JP | 03092983 A | 4/1991 |
| JP | 03092984 A | 4/1991 |
| JP | H09-168033 A | 6/1997 |
| JP | 10-210080 A | 8/1998 |
| JP | 10-327211 A | 12/1998 |
| JP | 3070110 U | 4/2000 |
| JP | 2000-298529 A | 10/2000 |
| JP | 2000-341387 A | 12/2000 |
| JP | 2001-257778 A | 9/2001 |
| JP | 2001-273135 A | 10/2001 |
| JP | 2001-306523 A | 11/2001 |
| JP | 2001-339503 A | 12/2001 |
| JP | 2001-358829 A | 12/2001 |
| JP | 2002-044727 A | 2/2002 |
| JP | 2004-268937 A | 9/2004 |
| JP | 2008-028109 A | 2/2008 |
| WO | 97/19519 A2 | 5/1997 |
| WO | 98/11750 A2 | 3/1998 |
| WO | 98/52371 A1 | 11/1998 |
| WO | 00/04476 A1 | 1/2000 |
| WO | 00/39743 A1 | 7/2000 |
| WO | 00/72508 A1 | 11/2000 |
| WO | 01/29731 A1 | 4/2001 |
| WO | 01/45283 A1 | 6/2001 |

(56) References Cited

FOREIGN PATENT DOCUMENTS

| WO | 01/92994 A2 | 12/2001 |
| WO | 2009064874 A2 | 5/2009 |

OTHER PUBLICATIONS w4.seimens.de—Newsdesk; retrieved online from http://w4.siemens.de/newsline.d/pressfor/e_9910_d.ht; (Visited Jan. 25, 2002), 2 pp.

\* cited by examiner

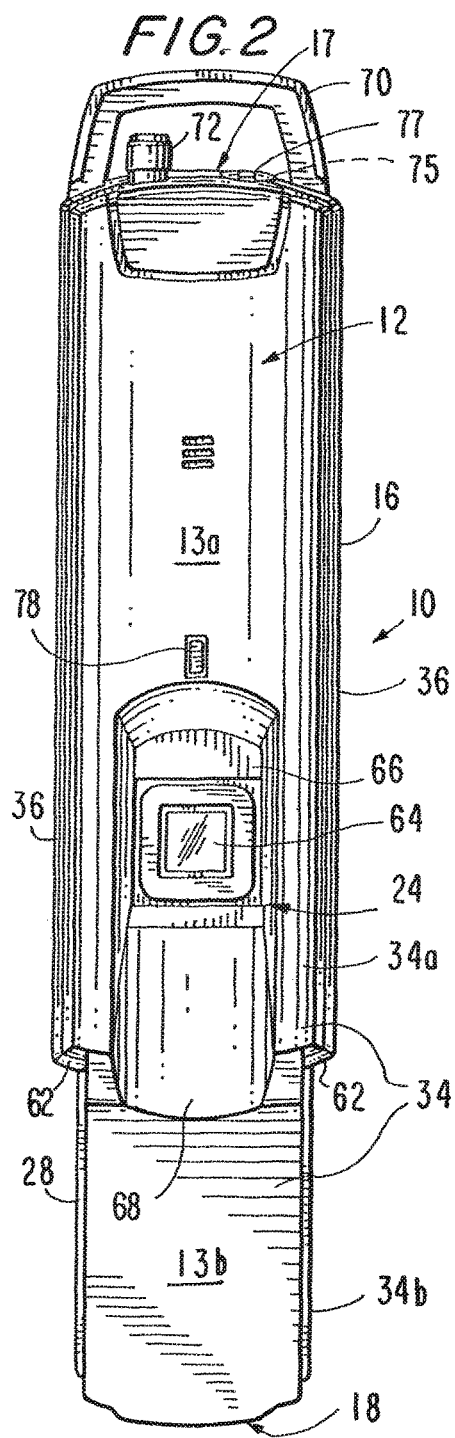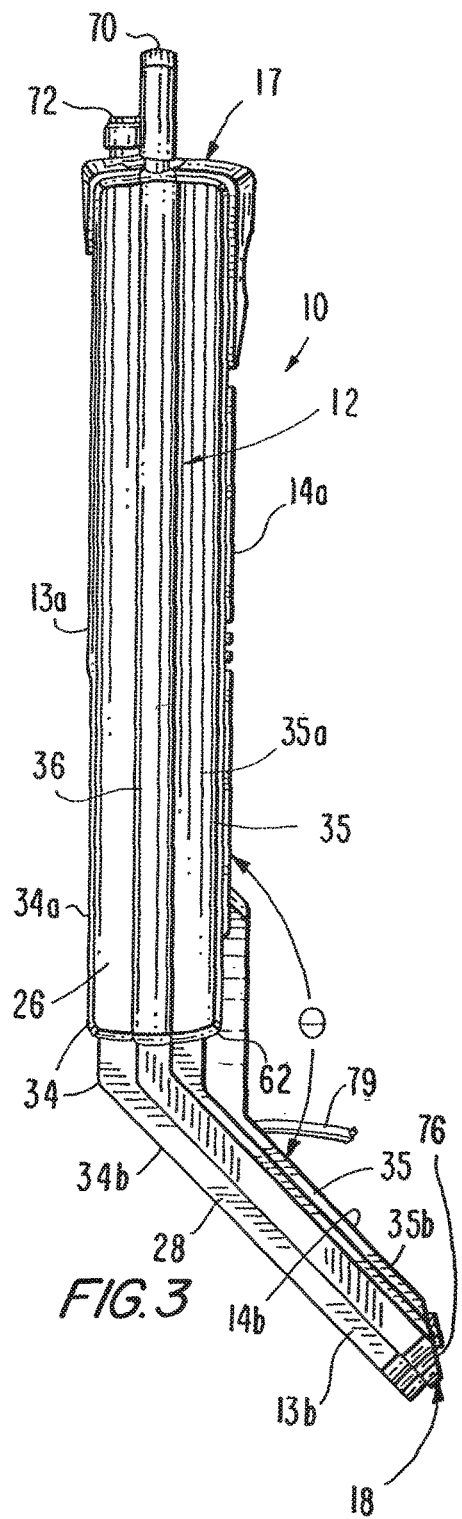

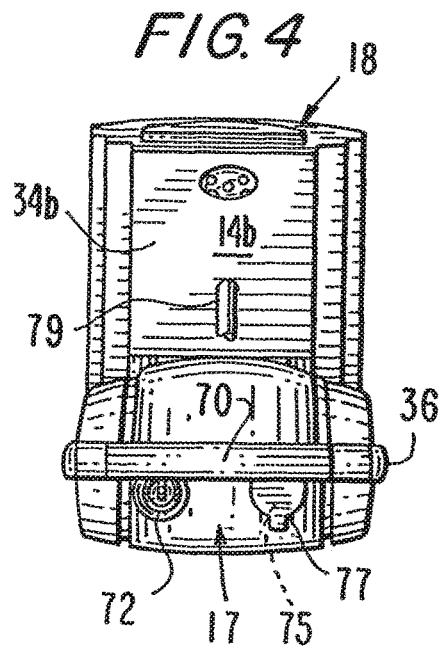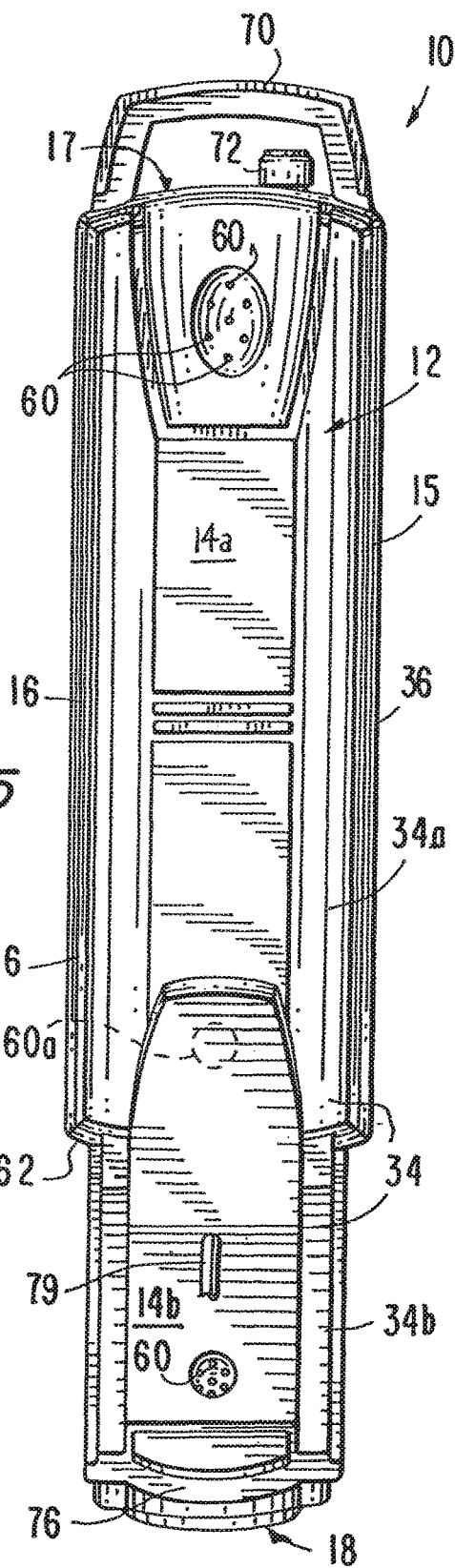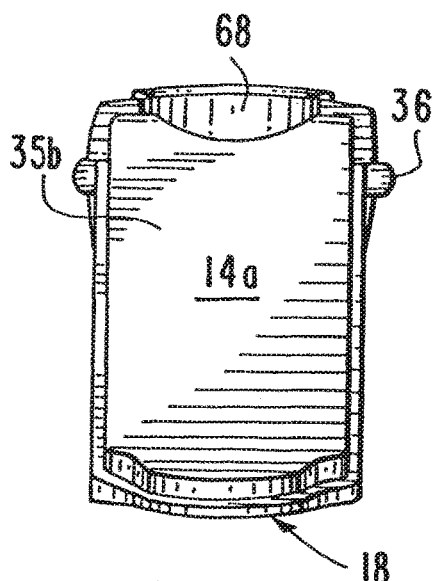

COMPUTER TERMINALS BIOMETRICALLY ENABLED FOR NETWORK FUNCTIONS AND VOICE COMMUNICATION

CROSS-REFERENCE TO RELATED APPLICATIONS

This application is a continuation of U.S. patent application Ser. No. 15/164,322, filed May 25, 2016, which is a continuation of U.S. patent application Ser. No. 12/044,616, filed Mar. 7, 2008, now U.S. Pat. No. 9,378,347, which is a continuation of U.S. patent application Ser. No. 10/081,132, filed Feb. 21, 2002, now U.S. Pat. No. 7,418,255, the disclosures of which are herein incorporated by reference in their entirety.

BACKGROUND OF THE INVENTION

The invention disclosed herein relates to biometric enablement of computer terminals for participation in one or more network-related functions and in voice communication over a network. More particularly, the biometric enablement involves finger-image sensing and authentication. The invention also relates to a telephone handset that includes a finger-image sensor, and the use of the handset for user identification and voice communication over the network.

The following patent documents disclose wireless telephones having a biometric identification device, and security systems for wireless communications. U.S. Pat. Nos. 6,141,436; 6,088,585; 5,796,858; 5,872,834; 6,219,793, 6,330457; 6,249,672; 6,177,950; 6,175,922; 6,111,977; 6,061,790; 6,064,737; 6,058,304; 6,078,908; 5,715,518; and 6,035,188, US Patent Applications 2002/0003892; 2001/0012201; 2001/0016819; and 2001/0017584; international and foreign patent documents: WO 98/11750; WO 01/45283; EP09699644; EP 0817515; and DE 19832638. The following patent documents disclose the use of biometrics to control access to computers or computer functions, or to control a transaction conducted using a computer: U.S. Pat. Nos. 6,337,919; 6,337,918; 6,282,304; 6,256,737; 5,420,936; 5,337,043; 5,838,306; 5,881,226; 5,991,408; 6,016,476; 6,154,727; 6,078,848; 6,160,903; published U.S. Patent Applications 2002/0010864; 2001/0051924; 2002/0007459; 2002/0010857; 2001/0049785; 2001/0048025; 2001/0048359; and 2001/0034717; international and foreign patent documents WO 01/29731; WO 00/72508; WO 01/92994; GB2312040; DE19541672; DE19920933; and FR2792438.

SUMMARY OF THE INVENTION

The invention provides a system for enabling a computer terminal to access or otherwise participate in at least one network-related function and voice communication over a network. The invention also provides a handset that includes a finger-image sensor, for use with a computer terminal, that provides finger-image-related signals or data for authentication purposes and voice-related signals for voice communications. The handset provides finger-image data that is used to biometrically identify a person who is seeking to access or otherwise participate in network functions including voice communication and at least one other network-related function using the terminal and/or the handset. Such access/participation is enabled after satisfactory identification of a prospective user. The handset may be coupled to a computer terminal either wirelessly or tethered.

The terms "computer terminal," "terminal" and "terminal device" are meant in a broad sense, and encompass PCs or other desktop computers or work stations, portable computers, client computers, thin clients, PDAs, etc., unless the context in which these terms is used indicates otherwise. Similarly, the terms "network," "computer system," "host computer" and "server" are meant in a broad sense.

In a preferred embodiment, the system comprises a telephone handset including a microphone and a speaker, and also the finger-image sensor, coupled to provide signals to and receive signals from the computer terminal for voice communication, and at least to provide finger-image-related signals to the computer terminal. Means are provided for electronically authenticating a finger-image sensed by the finger-image sensor of a handset based on the finger-image-related signals provided by that handset. Means are also provided that are responsive to the authenticating means for enabling the computer terminal in the network to access or otherwise participate in the performance of at least one network-related function and voice communication over the network between handsets, at least one of which provided finger-image-related signals based upon which a sensed finger-image was authenticated. In a preferred embodiment, communication is enabled between handsets which each have provided finger-image related signals based upon which a sensed finger-image was authenticated, i.e., between authenticated handsets. In some embodiments, communication can occur between an authenticated handset and an unauthenticated handset. An unauthenticated handset may both receive from and send voice-related data to an authenticated handset, or only receive from or send voice-related data to an authenticated handset.

The authentication means and the enabling means comprise programming that may be resident on or provided to the handset and/or the computer terminal, or may be resident on a host computer or server and operate entirely on the host computer or server, or operate on a distributed processing basis on the host computer or server, the computer terminal and the handset, or subcombinations thereof.

In a preferred embodiment, the telephone handset includes circuitry coupled to the microphone and speaker referred to above that at least converts between analog and digital signals, and an interface coupling the finger-image sensor and the circuitry with the computer terminal. In a preferred embodiment, circuitry is provided for voice functions and the finger-image sensor includes other circuitry for finger-image functions. Individual USB ports, coupled to a USB hub, are associated with the voice circuitry and with the finger-image circuitry. The handset preferably is keypadless, and each computer terminal includes a computer input device and is programmed to initiate a voice communication session in response to information entered using the input device.

In a preferred embodiment, the telephone handset comprises an elongated housing having opposed major sides and opposed ends. The speaker is positioned in the vicinity of a first end of the handset to transmit sound from a first major side of the handset, and the microphone is positioned in the vicinity of a second end of the handset to receive sound from a first major side of the handset. The finger-image sensor is positioned in the vicinity of and spaced from the second end of the handset to sense a finger-image from a second major side of the handset. Preferably, the handset has a contoured surface leading to the finger-image sensor to receive part of a human finger therein.

In one embodiment, the elongated housing has a larger first portion and a smaller second portion projecting at an angle from the first portion. Both portions have opposed major sides and opposed ends. The first end of the handset is an end of the first portion, in the vicinity of which is positioned the speaker. The first major side discussed above comprises the first major side of the first and second portions, and the second major side comprises the second major side of the first and second portions. The finger-image sensor is positioned in the vicinity of and spaced from an opposite end of the first portion of the handset to sense a finger-image from a second major side of the first portion of the handset. The second end of the handset is an end of the second portion in the vicinity of which is positioned the microphone to receive sound from the first major side of the second portion. The first and second portions are connected in the vicinity of the second end of the first portion and a first end of the second portion, and the first major side of the first portion and a first major side of the second portion form an internal obtuse angle. The contoured surface referred to above extends from the opposite end of the second portion to the finger-image sensor.

In another embodiment, the handset is generally straight, as opposed to having one portion angled with respect to the other portion, and includes only the larger upper portion, which has opposed major sides. The speaker and finger-image sensor are positioned as described above, and the microphone is positioned in the vicinity of the second end of the handset to receive sound from the first major side thereof. The second major side of the handset is contoured as described above, but from the second end of the handset to the finger-image sensor to receive part of a human finger therein.

The telephone handset preferably includes configuration or other means on the side thereof opposite the finger-image sensor, i.e., on the second major side of the handset or the first and second portions thereof for stably supporting the handset on or against a flat (or generally flat) surface during sensing of a finger-image. For example, flat or straight surfaces or projections may be provided positioned on the handset to support the handset on or against a flat surface. As mentioned, the handset preferably does not include a keypad. Hookswitch functions are preferably activated by a button projecting from the top of the handset.

In a preferred embodiment, the handset includes a bracket positioned in the upper part of the handset to suspend the handset from a projection engaging the bracket. When suspended from the bracket adjacent a flat (or generally flat) surface of a monitor or fixture, the handset can be pressed against the flat surface and be stably supported during sensing of a finger tip image.

BRIEF DESCRIPTION OF DRAWINGS

The invention is illustrated in the accompanying drawings which are meant to be exemplary and not limiting, in which like elements in the different figures relate to like or corresponding elements, and in which:

FIG. 2 is a front plan view of the handset depicted in FIG. 1;

FIG. 3 is a side view of the handset depicted in FIG. 1;

FIG. 4 is a top view of the handset depicted in FIG. 1;

FIG. 5 is a bottom view of the handset depicted in FIG. 1;

FIG. 6 is a rear plan view of the handset depicted in FIG. 1;

DETAILED DESCRIPTION OF THE PREFERRED EMBODIMENTS

Figure 1:
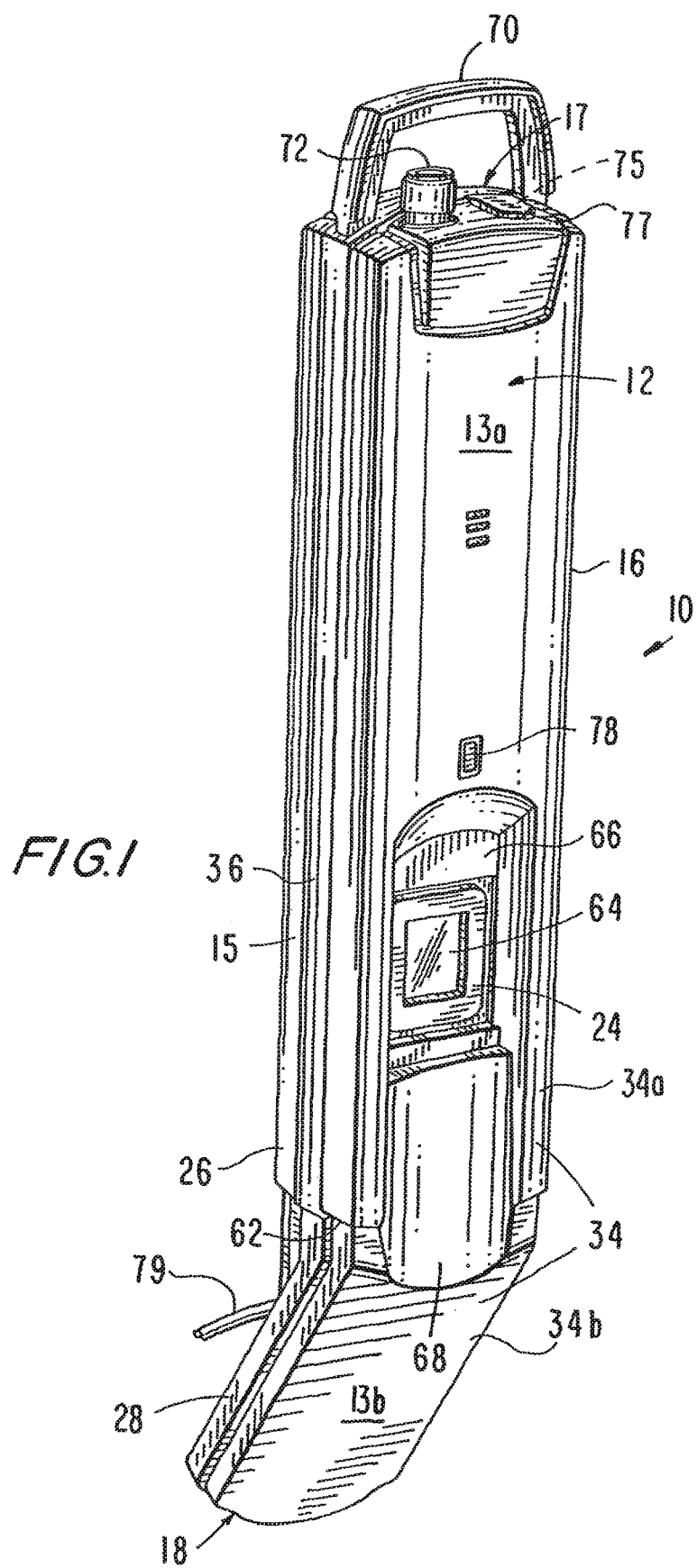
FIG. 1 is a perspective front view of a handset having a finger-image sensor according to a preferred embodiment of the invention.

Referring to FIGS. 1-6, a handset 10 according to a preferred embodiment of the invention includes a housing 12 having opposed major sides 13 (comprised of major sides 13a, 13b) and 14 (comprised of sides 14a and 14b). For convenience, the first major side 13 is referred to as the front, and the second major side as the rear of the handset. The handset 10 also includes minor sides 15, 16, 17 and 18. Sides 17 and 18 are also referred to the handset top and bottom, respectively. Mounted to the handset 10 are the components shown schematically in FIG. 7, including a microphone 20, a speaker 22 and a finger-image sensor 24.

In the embodiment depicted in FIGS. 1-6, the housing 12 includes a larger upper portion 26 and a smaller lower portion 28 that together form an internal obtuse angle θ (FIG. 3). The speaker is located near the top 17 of the handset 10 and the microphone near the bottom 18 of the handset 10, and the angle θ is selected so that the speaker and microphone can be conveniently located adjacent the average user's ear and mouth, respectively, in use.

The housing 12 in the embodiment depicted in FIGS. 1-6 comprises a front channel shaped part 34 and a rear channel shaped part 35 that meet along sides 15-18. Front part 34 includes front major side 13a, b and portions of minor sides 15-18, and rear part 35 includes rear major side 14a, b and portions of minor sides 15-18. A band 36, preferably made of an elastomeric material, extends around sides 15-18 over a seam where the front and rear parts 34 and 35 meet. The band 36 provides the function of overlaying and closing the seam between the front and rear parts 34 and 35, as well as ornamentation. For example, the band can have different thicknesses, shapes, and surface contours that provide recognizable detail to the handset.

The band 36 may be secured to the housing 12, and the front and rear parts 34 and 35 may be secured together in any suitable manner. For example, the band 36 may be secured to the front and/or rear parts 34 and 35 by interlocking parts such as grooves, ridges, projections, receptacles, etc., or by an adhesive, or bonded by any suitable process, and the front and rear parts may be joined by interlocking and/or snap-fitting parts, or by fasteners, or ultrasonic bonding or heat bonding, etc. Interlocking arrangements for securing the front and rear parts 34 and 35 together and for securing the band 36 to at least one of the front and rear parts are preferred to facilitate assembly and disassembly, e.g., for repair or servicing.

The front part 34 and the rear part 35 each include an upper portion 34a, 35a and a lower portion 34b, 35b, respectively, which are unitary, e.g., formed as a single piece, or from separately formed unitary pieces that are joined by any suitable process, e.g., an adhesive or other bonding process. Each unitary piece may be made, for example, of a suitable plastic, such as ABS in a molding process, or of any suitable material made by any suitable process.

Rear side 14b (FIG. 5) includes means for transmitting sound therethrough to the microphone 20, and rear side 14a includes means for transmitting sounds therethrough from the speaker 22. Any suitable structure may be used. In the embodiment shown in FIGS. 1-6, perforations 60 are provided in the rear side 14a, b near the microphone and speaker. The perforations 60 are shown as round, but any curved or straight configuration may be used in any suitable pattern for sound transmission. The size, shape and pattern of the perforations 60 are also ornamental.

The upper front portion 35a (FIG. 1) includes near the bottom or end 62 thereof, the outer portion of the finger-image sensor 24. An active portion 64 of the sensor 24 is disposed in a channel 66 near and spaced from the bottom 62 of the upper portion 34a. A contoured surface 68 leads to the active portion 64 to facilitate placement of a fingertip over the active portion 64 of the sensor 24. As shown, the contoured surface 68 begins at approximately the bottom 62 of the upper front portion 34a generally where the lower front portion 34b and the upper front portion 34a meet, and extends to the active portion 64. Since the upper and lower front portions 34a, b are angled with respect to each other, the entrance to the contoured surface 68 is unobstructed so that a finger can easily be slid or placed on the active portion 64 of the finger-image sensor. Many different contours may achieve the functions associated with finger placement and removal, so that the contoured surface 66 as shown is also ornamental.

The channel 66 and contoured surface 68 facilitate placement and location of a fingertip on the active portion 64 of the sensor 24. In the embodiment depicted in FIGS. 1-6, the front piece 34 includes distinct upper and lower portions 34a, 34 that are joined together, and the contoured surface 68 is part of a projection extending from the lower portion 34b. This structure enables the user to conveniently place a finger over the active sensor portion 64 without having to awkwardly bend the finger. The lower portion 28 may be used as a convenient grip, when one finger is placed over the active sensor portion 64, for the other fingers of a person's hand.

A loop or bracket 70 is attached to the band 36, but may be attached to the upper front or rear portion 34a, 35a. The bracket 70 is used to suspend the handset from a hook or projection (not shown) secured to a conventional computer monitor (not shown), e.g., a CRT device or a flat panel device such as an LCD, LED, active matrix or plasma device, or secured to another type of device or fixture. Such devices and features typically include a flat (or generally flat) surface. Preferably, the hook suspending the handset 10 is positioned above such a flat surface so the handset is suspended against or adjacent a flat surface.

The rear part 14a, b of the handset 10, at the top 17 and bottom 18 of the handset, is configured to stably support the handset 10 on a flat surface. Thus, with the handset 10 supported on a flat surface with the front part 13a, b exposed (or facing upward), a finger-image can be sensed while the handset is stably supported. Such structure may extend transversely across the rear piece 14a, b at the top and bottom, respectively, of the handset. In the embodiment depicted in FIGS. 1-6, this structure is straight edges at the top and bottom 17, 18 of the handset 10. Beveling 76 (FIG. 3) may also be provided at the top and/or bottom of the handset for this purpose as well as for ornamental purposes. Such configuration also stably engages the handset 10 against a computer monitor or a fixture when the handset is suspended from the bracket 70, so that a finger-image can be sensed when the handset is suspended.

Figure 7:
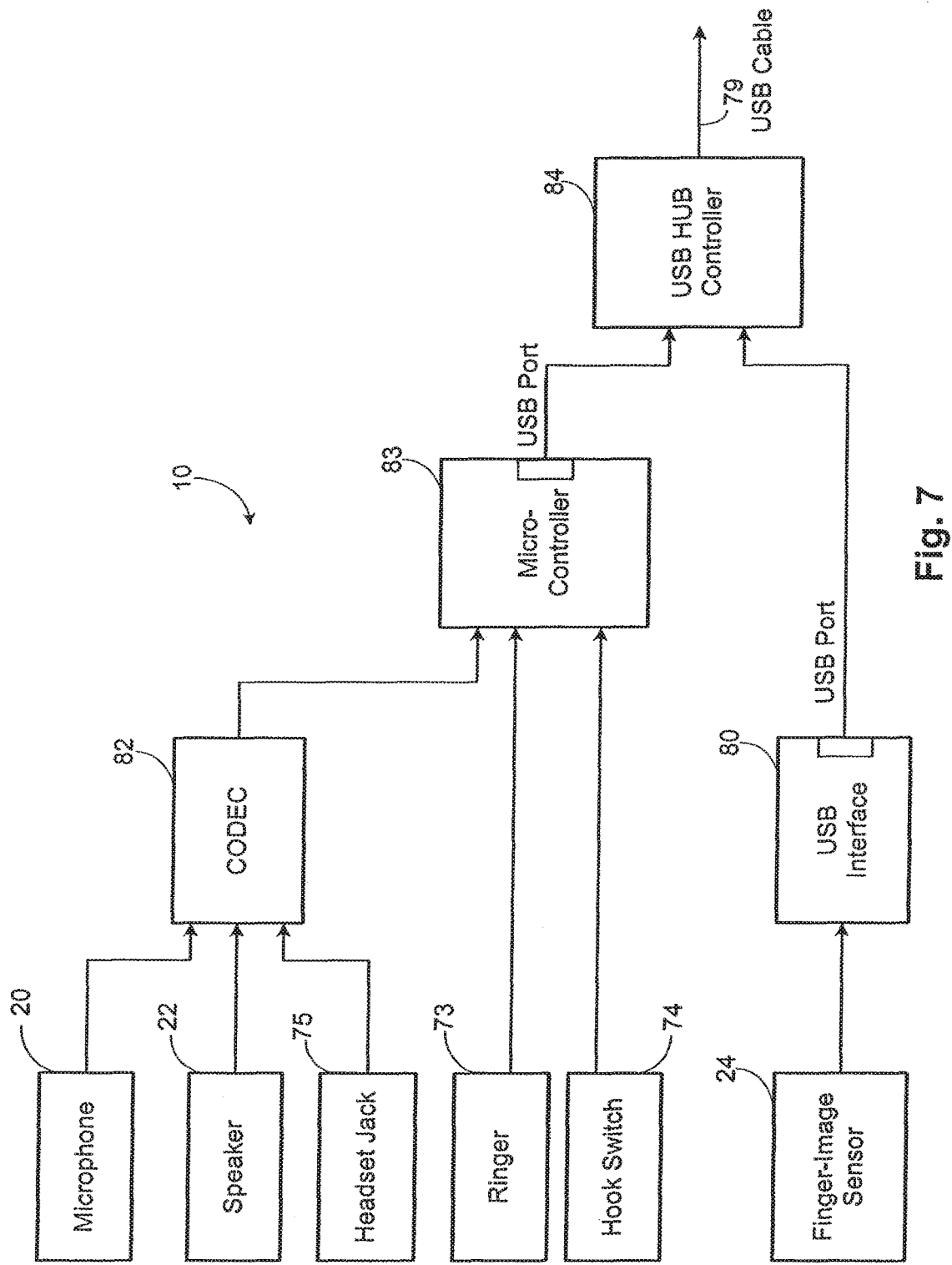
FIG. 7 is a block diagram of electronic components included in the handset depicted in FIG. 1.

A hookswitch button 72 protrudes through the top 17 of the handset 10. The hookswitch button 72 forms part of a microswitch 74 (FIG. 7) within the handset 10 that is electrically connected as shown in FIG. 7 to perform hookswitch functions. A conventional headset jack 75, below a flap 77, is provided for receiving a plug connected to an headset (not shown). An LED 78 visible from the front 13 indicates when the handset is active.

In another embodiment of handset 10, not fully shown, the second portion 28 is not provided. In that embodiment, the handset is straight, and the microphone is positioned in the vicinity of the end 62 of the handset, as represented by the broken line circle referenced by 60a, to transmit sound through major side 14a.

A cable 79, connectable to a computer or computer terminal such as a PC, extends from the lower front portion 34b of the handset restrained by a grommet (not shown) inside the handset 10.

Much of the surface configuration and shape of the handset is solely ornamental in nature, while some has ornamental and functional aspects.

Figure 8:
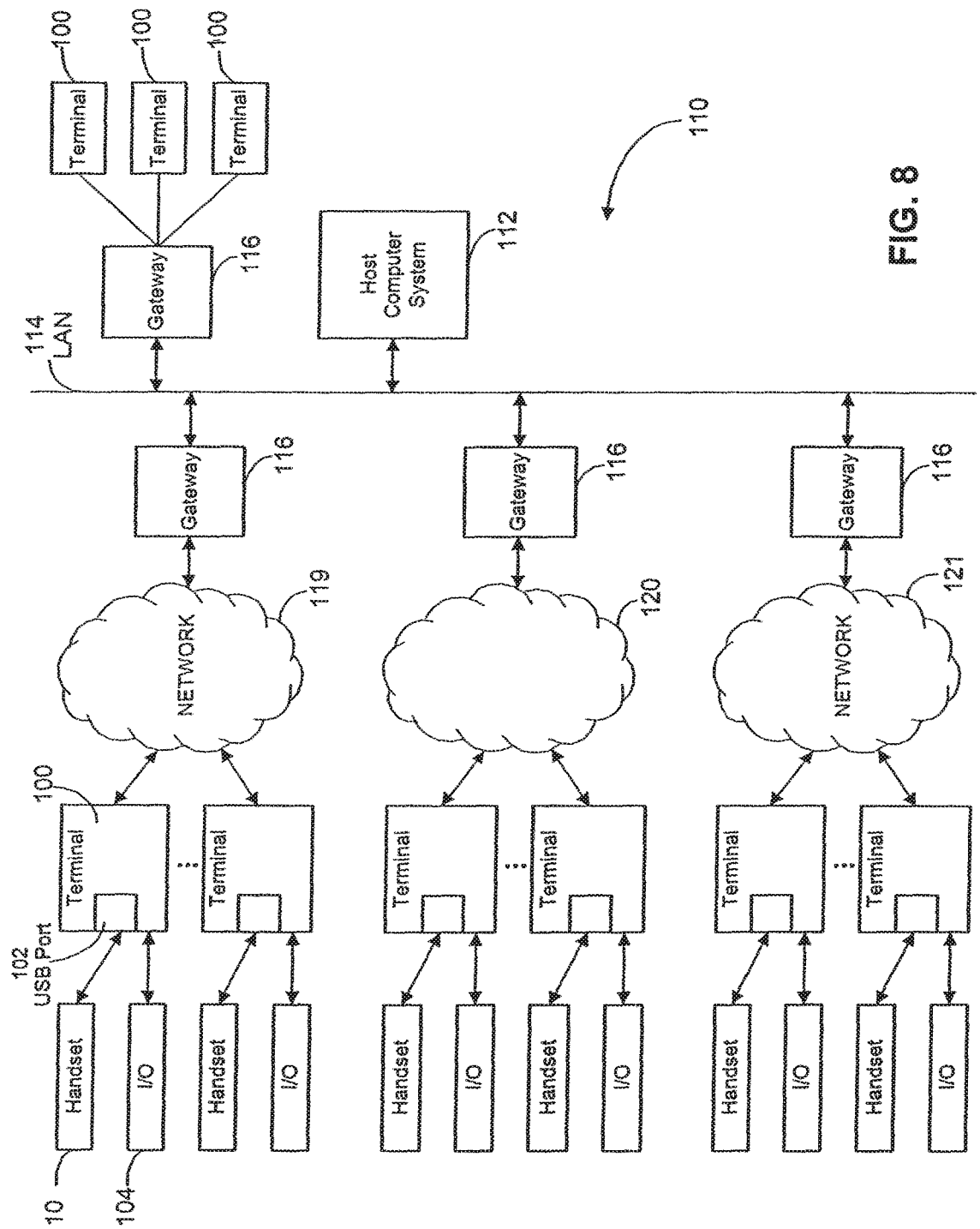
FIG. 8 is a block diagram of a computer system in which the handset depicted in FIG. 1 is used.

The handsets described herein allow users to communicate telephonically over a network such as the Internet, an Intranet or a proprietary network, as illustrated, for example, in FIG. 8. Referring to FIG. 7, the handset 10 includes the microphone 20, the speaker 22, the headset jack 75, a ringer 73, the hookswitch 74, the finger-image sensor 24, a USB interface 80 for the finger-image sensor 24, a codec 82, a microcontroller 83, a USB hub controller 84 and the cable 79. The microphone 20, the speaker 22 and the headset jack 75 are coupled to a u-law and/or A-law compatible PCM codec 82, which provides the following functions: receives analog audio input signals from the microphone 20 and provides u-law or a-law compatible compressed digital signals; receives u-law or a-law compatible compressed digital signals and converts to analog audio signals for the speaker 22 and headset jack 75. The codec 82 comprises a suitable circuit or circuits for performing these functions, for example, an analog to digital convertor circuit, digital to analog convertor and a codec, provided either as separate integrated circuits, or a single integrated circuit that perform the functions described above. An example of a single integrated circuit that performs those functions is National Semiconductor TP3054.

The codec 82 is coupled to the microcontroller 83, to which the ringer 73 and the hookswitch 74 are also coupled. The microcontroller 83 controls handset-related telephony functions, including ringer functions, responsive to the hookswitch 74 and signals from a computer terminal 100 to which the handset 10 is coupled. Any suitable controller may be used as the microcontroller 83. The microcontroller 83 is coupled to the USB hub controller 84, e.g., Alcor AU9254 available from Alcor Micro Corp. of Taipei, Taiwan. Any suitable ringer, e.g., piezoelectric, may be used as the ringer 73. The finger-image sensor 24 either includes a USB port, or USB interface circuitry 80 is provided to interface the finger-image sensor 24 with the USB hub controller 84. The USB Hub 84 controller is configured for connection to a USB port on a computer terminal to transmit signals to and receive signals from the computer terminal, including audio-related signals or data and finger-image-related signals or data. The finger-image sensor 24 may be implemented by any suitable technology. Suitable sensors are available from Authentec, Inc., of Melbourne, Fla. for example, the FingerLoc™ or EntrePad™ families of finger-image sensors The USB hub controller 84 allows the finger-image sensor 24 and the codec 82 to communicate with a single USB port of the computer terminal via the cable 79. The power required to drive the components of the handset 10 is preferably provided by the computer terminal to the handset over the cable 79, e.g., from a USB port located on computer or terminal device.

Additional circuitry, known to those of skill in the relevant arts, may be provided, for example, in blocks 20, 22, 74, 72, 73, 24, 80, 82, 83 and 84 in FIG. 7, or separately, to assist in achieving the functions described herein.

Referring to FIG. 8, handsets 10 are connected to computer terminals 100 that in the preferred embodiment include a USB port 102. The computer terminals 100 include or have coupled thereto input and output devices represented by block 104, such as a keyboard, mouse or other pointing device, computer monitor, printer, etc. The terminal devices 100 are connected in a computer network or system 110 through a communications network, the Internet or an intranet, presented by clouds 119-121 or a LAN or WAN.

Networks including computer terminals that perform network functions such as information delivery, trading of financial interests, Internet, and provide for voice communication over the network by means of packet protocols, e.g. TCP for data and UDP for voice, are known. The invention is not concerned with the specific network or communications system which supports the network functions and voice communications associated with the handset 10 and/or a computer terminal to which a handset 10 is coupled. Therefore, FIG. 8 represents an example of a network and computer system, and is intended to be exemplary and not limiting. Other networks and computer systems are known to those having ordinary skill in the relevant art(s), and the following discussion is at a high level with the understanding that the described network and computer system are meant to be exemplary. Details of such networks and systems are known to those having ordinary skill in the relevant art(s). Similarly, telephony software for voice communication over a data network, e.g., the Internet, intranets, etc, is also known to those having ordinary skill in the relevant art(s).

The computer system 110 (FIG. 8) includes one or more host computers and/or servers represented by host computer system block 112 connected, for example, in a LAN 114 for carrying out network functions. Access to the LAN 114 and the host computer system 112 is controlled by gateways 116. The computer terminals 100 may communicate with the LAN 114 through gateways 116 directly, as illustrated in the upper right hand portion of FIG. 8, and through communications networks 119, 120 and 121. Examples of communications networks are the Internet, intranets and proprietary networks such as the BLOOMBERG PROFESSIONAL® service.

Authorization is required for handsets 10 and terminal devices 100 to access or otherwise participate in network functions and to participate in, or at least initiate, voice communications over the network, i.e., initiating, transmitting, receiving or all of these functions. In the preferred embodiment, such authorization includes finger-image authentication. Means for authenticating finger-images of authorized users, including authentication software, are available, for example, from Authentec, Inc. of Melbourne, Fla. Such software may be stored locally in terminal devices 100, or in the host computer system 112, or is distributed among them or in any subcombination of them. Authentication, which may involve comparison of finger-image data provided by finger-image sensors 24 in handsets 10 with stored finger-image data for matches, is required before a terminal device 10 is permitted to access or otherwise participate in selected any or all network functions, such as participation in trading of financial interests, and to participate in voice communication. Access to terminal devices 100 and network functions may also be password protected. Access control using finger-image and password authentication, and means for performing access control using finger-image and password authentication, are generally known to those of skill in the relevant art(s). Therefore, only a high level, general description thereof is included herein.

In the preferred embodiment, a user seeking access to the host computer system 112 or any selected network related function enters a user name and password in response to a suitable log-on screen or set of screens. Once the user name and password have been authorized, the user is then prompted by another log-on or set of log-on screens to provide his or her finger-image for a reading by the finger-image sensor 24. The finger-image data obtained by the finger-image sensor 24 is communicated to the computer terminal 100, which includes all required drivers to obtain and receive the finger-image data.

In one embodiment, authentication proceeds in computer terminal 100 with software and stored finger-image data provided by the host computer system 112. In this embodiment, the finger-image comparison software is downloaded into the computer terminal 100 from the host computer system 112, and previously acquired finger-image templates stored on the host computer system 112 are retrieved for comparison against the finger-image data obtained by the finger-image sensor 24. If a match is found by authentication means associated with the computer terminal 100, that information is communicated to the host computer system 112, and means in the computer system responds to enable a computer terminal to access or otherwise participate in any selected function in the computer system 110. Alternatively, the finger-image data obtained by a finger-image sensor 24 is uploaded to the host computer system 112, where authentication means determines whether there is a match and provides authentication. It is also possible for the handset to include software to compare finger-image data provided by the finger-image sensor 24 with finger-image data stored in the handset, or provided to the handset.

For example, after selected or all functions of a computer terminal 100 have been enabled in response to authentication, a user may access such functions and initiate and receive voice communications without further authorization. Alternatively, a terminal device 100 may be authorized to receive voice communications without finger-image and or password authentication, but not to initiate or transmit voice communications without such authorization, etc. A separate authorization procedure may be required each time a user seeks to execute a sensitive or other desired function.

In one embodiment, a user may access the computer system 110 from any computer terminal 100 upon authentication of his or her finger-image. If desired, such authentication at various terminal devices may also be used to track the presence of the user. More specifically, the host computer system 112 can track the presence of the user at any given terminal device. Tracking can operate on the basis that a user is present at the last terminal device that remains logged on at which the user's finger-image was authenticated. Alternatively, users can be required to provide a finger-image sense when leaving a terminal device that remains logged on, or to re-log on with finger-image authentication at given times or intervals.

The presence status of the intended recipient at his or her usual or "home" terminal, or at another terminal may be displayed on the computer monitor of a user initiating a call or email with, for example, a suitable icon or message. The call or email initiator can then decide whether to complete the call or send the email to the home terminal of the intended recipient or to such other terminal at which the intended recipient is present, as determined by finger-image detection.

Using the handset 10 and suitable telephony software, a voice call can be set up over a network, such as the one represented in FIG. 8. Each of the computer terminals 100 has a unique address or identifier, which in the Internet is an IP address and in other networks may be a terminal ID, etc. Thus, each computer terminal can address one or more other computer terminals by means of these unique addresses. Gateways 116, and routers or other hardware and software in networks 118, 119 and 120, direct digitized voice data to addressed computer terminals in the proper format.

Requests from computer terminals 100 to establish a voice call are forwarded to the host computer system 112 via a gateway 116. A host computer in the host computer system 112 checks for user authorization and determines whether the called user exists, is valid or is otherwise recognized by the system, such as being a member of a group or alias defined by the calling party. The host computer also determines whether the called party has a handset 10 connected to that party's computer terminal 100. For example, USB device drivers included in the computer terminals 100 can automatically detect the presence of a handset 10, and this information may be conveyed to a host computer.

If the called party has a connected handset, the host computer can determine whether the called party is logged on. In the event that the called party is not logged on, the host computer may signal or send an appropriate informational message to the calling party. The host computer may also interface with or include a voice mail subsystem so as to enable the calling party to leave a voice mail.

The host computer signals the computer terminal of the called party that an incoming voice call has arrived. The computer terminal, in turn, using a suitable device driver, causes the handset speaker to sound a ring tone and/or the computer terminal visually indicates an incoming call on the display monitor of the called computer terminal. The called party may accept the call by pressing the handset hookswitch button 72, or by entering a keyboard or mouse command. In either case, the called computer terminal notifies the host computer that the call has been accepted, and the host computer, in turn, notifies the calling computer terminal that the call has been accepted.

In the illustrated embodiment, the gateways 116 establish a communication path over intra- or inter-gateway links. The computer terminals preferably segment digital voice data received from the handset into packets, e.g. according to a protocol such as UDP, addressed to the other party or the gateway thereof. The terminal devices are preferably configured to use a predetermined UDP port for voice traffic, but in alternative embodiments, the UDP port may be established dynamically by the host computer and communicated to the terminal devices. In a further alternative, the UDP port may be determined through negotiation between the calling and called terminal devices.

Voice calls are terminated when a user either toggles the hookswitch 74 of the handset or enters a pre-determined user-based command with the computer terminal's input device. Either event is communicated to the host computer and interpreted as a request to terminate the call. In this case, the host computer instructs the calling and called terminal devices to terminate the session. Conference calls can be established in manner similar to the establishment of a bi-directional call. The host computer associated with the calling party can go through the same steps described above for each called party. A conference call can be set up to substantially simultaneously to connect multiple parties, if desired. To support this function, voice group data is stored in a manner similar to storing e-mail group data.

Hardware and software are known to those of skill in the art or can be constructed from the disclosure herein for performing the telephony functions described herein, including the use of VOW in networks such as the Internet and intranets and proprietary networks.

Although embodiments of a handset with a finger-image sensor and a network in which it is used have been disclosed, other embodiments of handsets may be used in the disclosed networks as well as in other networks. Those having ordinary skill in the relevant art(s) will understand that a variety of programming methodologies can be used to implement the network and telephony functions discussed above. Similarly, numerous modifications and variations may be made to the embodiments described herein without departing from the spirit and scope of the invention, and the claims are intended to cover all such modifications and variations to the extent permitted by the prior art.

The invention claimed is:

1. A system comprising:
   a first computer terminal comprising a finger image sensor;
   a second computer terminal; and
   a host computer configured to perform operations comprising:
      determining that an intended recipient is present at the first computer terminal based on a finger image sensed by the finger image sensor of the first computer terminal,
      receiving a request from the second computer terminal to initiate a communication function with the first computer terminal based on the intended recipient being present at the first computer terminal, and
      initiating the communication function between the first computer terminal and the second computer terminal in response to the request.

2. The system of claim 1, the operations further comprising:
   enabling the first computer terminal to access a function that is not related to and does not depend upon participation by the first computer terminal in the communication function.

3. The system of claim 1, the operations further comprising:
   authenticating the finger image sensed by the finger image sensor of the first computer terminal.

4. The system of claim 3, wherein the authenticating is performed each time the intended recipient present at the first computer terminal initiates a particular function.

5. The system of claim 3, wherein the authenticating is performed at a periodic time interval.

6. The system of claim 1, wherein the second computer terminal is an unauthenticated computer terminal.

7. The system of claim 1, the operations further comprising:
   authenticating a second finger image sensed by a second finger image sensor of the second computer terminal.

8. The system of claim 1, wherein determining that an intended recipient is present at the first computer terminal based on a finger image sensed by the finger image sensor of the first computer terminal comprises:
   determining that the first computer terminal is a last computer terminal at which the finger image was sensed.

9. The system of claim 1, wherein the second computer terminal comprises:
a display device configured to display an indication that the intended recipient is present at the first computer terminal.

10. A host computer comprising:
a processor; and
a memory to store computer program instructions, the computer program instructions when executed on the processor cause the processor to perform operations comprising:
determining that an intended recipient is present at a first computer terminal based on a finger image sensed by a finger image sensor of the first computer terminal,
receiving a request from a second computer terminal to initiate a communication function with the first computer terminal based on the intended recipient being present at the first computer terminal, and
initiating the communication function between the first computer terminal and the second computer terminal in response to the request.

11. The host computer of claim 10, the operations further comprising:
enabling the first computer terminal to access a function that is not related to and does not depend upon participation by the first computer terminal in the communication function.

12. The host computer of claim 10, the operations further comprising:
authenticating the finger image sensed by the finger image sensor of the first computer terminal.

13. The host computer of claim 12, wherein the authenticating is performed each time the intended recipient present at the first computer terminal initiates a particular function.

14. The host computer of claim 12, wherein the authenticating is performed at a periodic time interval.

15. A method comprising:
determining that an intended recipient is present at a first computer terminal based on a finger image sensed by a finger image sensor of the first computer terminal,
receiving a request from a second computer terminal to initiate a communication function with the first computer terminal based on the intended recipient being present at the first computer terminal, and
initiating the communication function between the first computer terminal and the second computer terminal in response to the request.

16. The method of claim 15, further comprising:
enabling the first computer terminal to access a function that is not related to and does not depend upon participation by the first computer terminal in the communication function.

17. The method of claim 15, wherein the second computer terminal is an unauthenticated computer terminal.

18. The method of claim 15, further comprising:
authenticating a second finger image sensed by a second finger image sensor of the second computer terminal.

19. The method of claim 15, wherein determining that an intended recipient is present at a first computer terminal based on the finger image sensed at the first computer terminal comprises:
determining that the first computer terminal is a last computer terminal at which the finger image was sensed.

20. The method of claim 15, further comprising:
sending, to the second computer terminal, an indication that the intended recipient is present at the first computer terminal for displaying at the second terminal.

\* \* \* \* \*

UNITED STATES PATENT AND TRADEMARK OFFICE
CERTIFICATE OF CORRECTION

| | | |
|---|---|---|
| PATENT NO. | : 10,313,501 B2 | Page 1 of 1 |
| APPLICATION NO. | : 15/876735 | |
| DATED | : June 4, 2019 | |
| INVENTOR(S) | : Michael R. Bloomberg, John D. Waanders and Helmars Ericks Ozolins | |

It is certified that error appears in the above-identified patent and that said Letters Patent is hereby corrected as shown below:

On the Title Page

On page 2, at Item (56) References Cited, Foreign Patent Documents section, the foreign patent document number "EP 3817515 A1 1/1998" should read --EP 0817515 A1 1/1998--

In the Specification

Column 9, Line 36, "handset speaker" should read --handset speaker 20--

Column 10, Line 7, "use of VOW in networks" should read --use of VOIP in networks--

Signed and Sealed this
Seventeenth Day of September, 2019

Andrei Iancu
*Director of the United States Patent and Trademark Office*